United States Patent
Hsieh

(10) Patent No.: US 10,540,774 B1
(45) Date of Patent: Jan. 21, 2020

(54) STRUCTURED LIGHT DEPTH SENSOR AND SENSING METHOD THEREOF

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Yi-San Hsieh, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 16/285,499

(22) Filed: Feb. 26, 2019

(30) Foreign Application Priority Data

Nov. 9, 2018 (CN) .......................... 2018 1 1331270

(51) Int. Cl.
*G06T 7/521* (2017.01)
*G01B 11/22* (2006.01)
*G01B 11/25* (2006.01)

(52) U.S. Cl.
CPC .............. *G06T 7/521* (2017.01); *G01B 11/22* (2013.01); *G01B 11/25* (2013.01)

(58) Field of Classification Search
CPC ......... G01B 11/22; G01B 11/24; G01B 11/25; G01B 11/2509; G01B 11/2513; G01B 11/2518; G01B 11/2522; G01B 11/2531; G01B 11/2536; G06T 7/50; G06T 7/521; G06T 7/529; G06T 7/55; G06T 7/565; G06T 7/586

See application file for complete search history.

(56) References Cited

U.S. PATENT DOCUMENTS

| | | | | |
|---|---|---|---|---|
| 7,212,663 | B2 * | 5/2007 | Tomasi | G01B 11/25 382/106 |
| 7,852,461 | B2 * | 12/2010 | Yahav | G01S 17/023 356/3.08 |
| 8,896,594 | B2 * | 11/2014 | Xiong | H04N 13/271 345/419 |
| 9,445,081 | B1 * | 9/2016 | Kouperman | H04N 5/247 |
| 9,530,215 | B2 * | 12/2016 | Siddiqui | G06T 7/521 |
| 9,712,806 | B2 * | 7/2017 | Olmstead | H04N 19/17 |
| 9,800,859 | B2 * | 10/2017 | Venkataraman | G01P 3/38 |

(Continued)

*Primary Examiner* — Gordon J Stock, Jr.
(74) *Attorney, Agent, or Firm* — ScienBiziP, P.C.

(57) ABSTRACT

A structured light depth sensor for sensing a depth of an object, comprises: a projector for projecting structured lights with different codes to the object; a camera located on one side of the projector and configured for capturing the structured lights reflected by the object; a storage device for storing parameter information of the camera and distance information between the projector and the camera; and a processor electrically connected to the projector, the camera, and the storage device. The processor controls the projector to sequentially project the structured lights with different codes to the object, controls the camera to sequentially capture the structured lights reflected by the object, and calculates the depth of the object. A sensing method adapted for the structured light depth sensor is also provided.

18 Claims, 8 Drawing Sheets

(56) References Cited

U.S. PATENT DOCUMENTS

| | | | | |
|---|---|---|---|---|
| 9,872,012 | B2* | 1/2018 | Paramonov | H04N 5/332 |
| 9,916,524 | B2* | 3/2018 | Fanello | G06K 9/627 |
| 10,068,338 | B2* | 9/2018 | Atanassov | G06K 9/2027 |
| 10,192,311 | B2* | 1/2019 | Pan | G06T 7/521 |
| 10,194,138 | B2* | 1/2019 | Zhou | H04N 13/254 |
| 2004/0005092 | A1* | 1/2004 | Tomasi | G01B 11/25 |
| | | | | 382/154 |
| 2010/0074532 | A1* | 3/2010 | Gordon | G01B 11/25 |
| | | | | 382/203 |
| 2016/0255332 | A1* | 9/2016 | Nash | G06F 11/10 |
| | | | | 348/46 |
| 2016/0261852 | A1* | 9/2016 | Hirasawa | G01B 11/24 |
| 2017/0186167 | A1* | 6/2017 | Grunnet-Jepsen | G06T 7/521 |
| 2017/0195656 | A1* | 7/2017 | Nash | G06T 7/521 |
| 2017/0337703 | A1* | 11/2017 | Wu | G06T 7/11 |
| 2018/0020195 | A1* | 1/2018 | Lindner | G06T 7/50 |
| 2018/0059679 | A1* | 3/2018 | Taimouri | G05D 1/0088 |
| 2018/0321384 | A1* | 11/2018 | Lindner | G01S 17/89 |
| 2019/0045173 | A1* | 2/2019 | Hicks | H04N 13/271 |
| 2019/0064359 | A1* | 2/2019 | Yang | G01S 17/42 |
| 2019/0089939 | A1* | 3/2019 | Chew | H04N 13/25 |
| 2019/0101382 | A1* | 4/2019 | Taubin | G01B 11/254 |
| 2019/0122378 | A1* | 4/2019 | Aswin | G06T 7/571 |
| 2019/0213746 | A1* | 7/2019 | Azuma | G06K 9/6202 |

* cited by examiner

STRUCTURED LIGHT DEPTH SENSOR AND SENSING METHOD THEREOF

FIELD

The disclosure generally relates to structured light depth sensors.

BACKGROUNDING

Structured light depth sensors have been widely used in face recognition, gesture recognition, 3D scanners, and precision machining, and can be divided into time identification and space identification principles. The face recognition and the gesture recognition mostly use the space identification technique to consider the requirement of identification speed and the limitation of sensing distance.

The structured light depth sensor can calculate the depth of an object by using a projector for projecting structured lights onto the object. In prior art, the projector is usually composed of a plurality of point light sources arranged irregularly, which is not easily obtained, and the size of a block set for detecting and calculating the depth of the object is too large, resulting in low accuracy. Therefore, there is room for improvement within the art.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series, and the like. The term "coupled" is defined as connected, whether directly or indirectly through intervening components, and is not necessarily limited to physical connecting. The connecting can be such that the objects are permanently connected or releasably connected.

Figure 1:
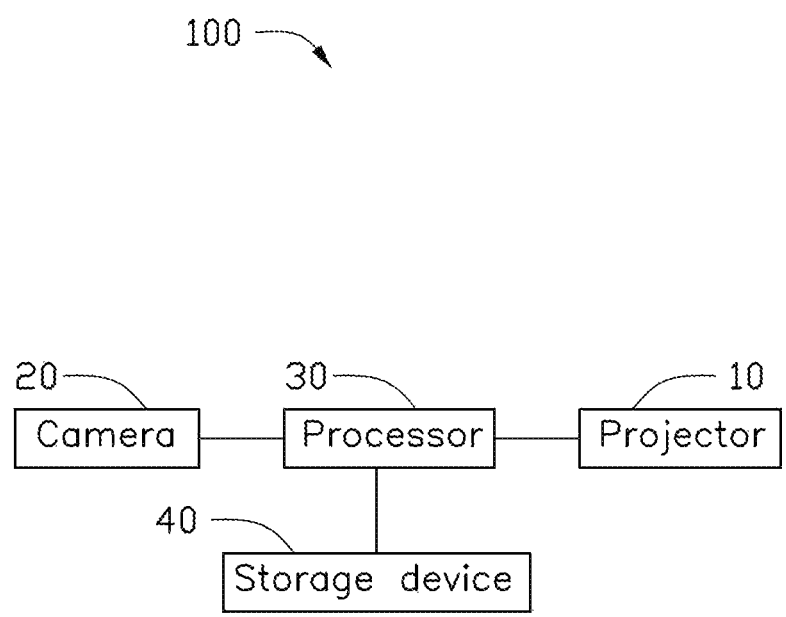
FIG. 1 is a structural block diagram of a structured light depth sensor.

FIG. 1 shows a structured light depth sensor 100 of an embodiment of the present disclosure. The structured light depth sensor 100 includes a projector 10, a camera 20, a processor 30, and a storage device 40. The processor 30 is electrically connected to the projector 10, the camera 20, and the storage device 40. The storage device 40 stores parameter information of the camera 20, and distance information between the projector 10 and the camera 20.

Figure 2A:
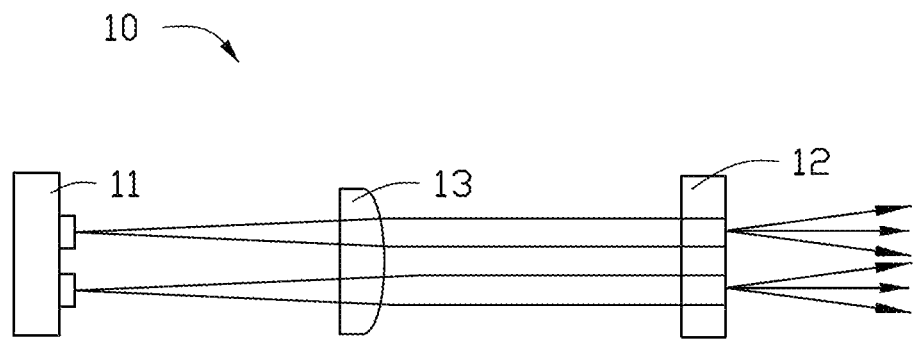
FIG. 2A is a schematic diagram of a projector of the structured light depth sensor shown in FIG. 1.
Figure 2B:
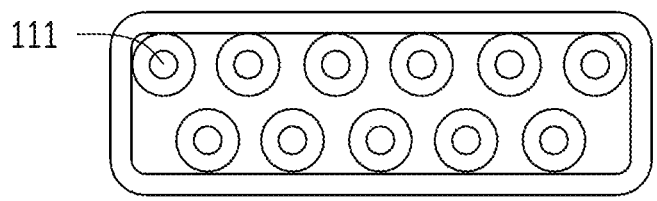
FIG. 2B is a schematic diagram of a multi-point light source of the projector shown in FIG. 2A.

As shown in FIG. 2A and FIG. 2B, the projector 10 includes a multi-point light source 11, a diffractive optical element 12, and a lens 13. The multi-point light source 11 includes a plurality of point light sources 111. The point light sources 111 are arranged in rows and equally spaced apart from each other. The diffractive optical element 12 is positioned opposite to the multi-point light source 11 for dividing a light emitted from the multi-point light source 11 into a plurality of beams. The lens 13 is positioned between the multi-point light source 11 and the diffractive optical element 12, and configured for transmitting the light emitted from the multi-point light source 11. In at least one embodiment, the multi-point light source 11 is a vertical-cavity surface-emitting laser.

Figure 3:
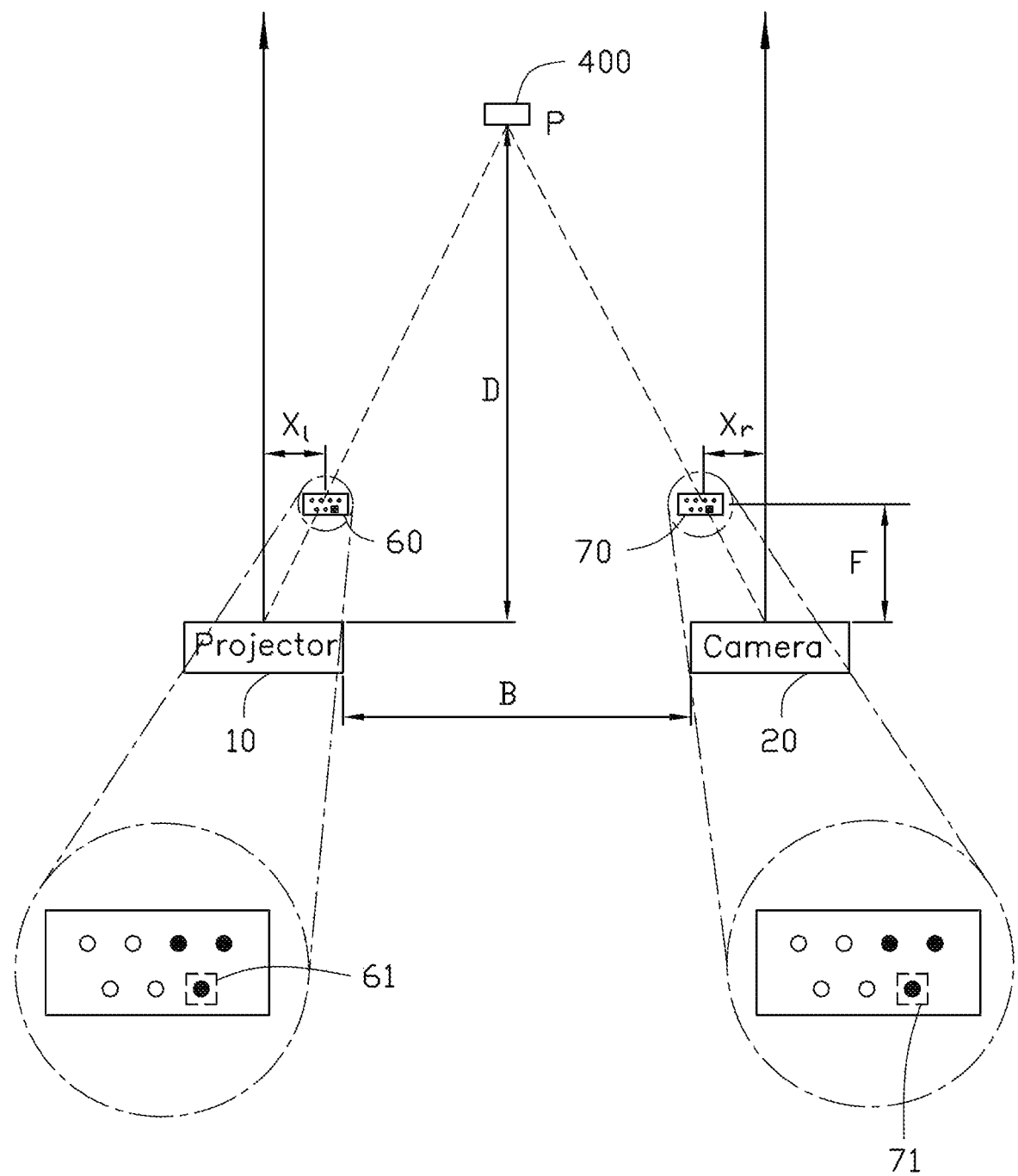
FIG. 3 is a schematic diagram of the structured light depth sensor shown in FIG. 1.

As shown in FIG. 3, the camera 20 is located on one side of the projector 10. A distance between the camera 20 and the projector 10 is defined as B and stored in the storage device 40 as the distance information. A focal length of the camera 20 is defined as F and stored in the storage device 40 as the parameter information. The processor 30 can control the projector 10 to sequentially project structured lights with different codes to an object 400, and control the camera 20 to sequentially capture the structured lights reflected by the object 400. A depth of the object 400 can be calculated by the processor 30 according to the parameter information and the distance information stored in the storage device 40, information of the structured lights projected by the projector 10, and information of the structured lights captured by the camera 20.

The structured light depth sensor 100 can sense the depth of the object 400 as follows. When the processor 30 controls the projector 10 to project one of the structured lights with a certain code to obtain a coded image 60, the structured light reflected by the object 400 is captured by the camera 20 to obtain a captured image 70. The captured image 70 is compared with a coding block 61 set in the coded image 60 by the processor 30 to match a capturing block 71 in the captured image 70. A distance between the coding block 61 and an extension line of the projector 10 is defined as $x_l$. A distance between the capturing block 71 and an extension line of the camera 20 is defined as $x_r$. A disparity ($\delta$) of the coding block 61 and the capturing block 71 is equal to difference between $x_l$ and $x_r$. The processor 30 calculates the depth (D) of the object 400 according to the following formula D=B*F/$\delta$.

Figure 4:
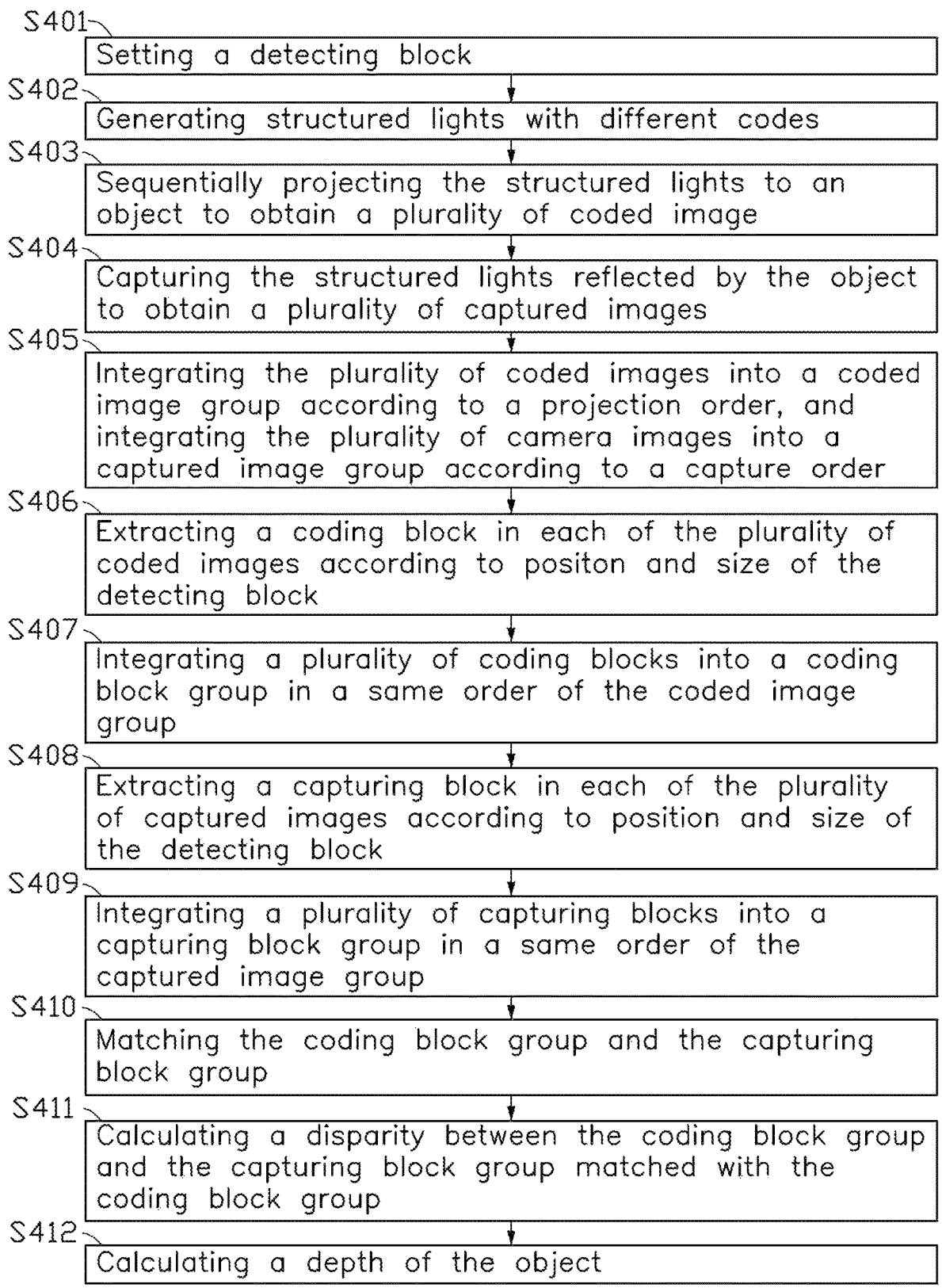
FIG. 4 is a flow chart of a sensing method adapted for the structured light depth sensor.

FIG. 4 shows a sensing method adapted for the structured light depth sensor 100 which includes the following steps:

S401, setting a detecting block 90;

S402, generating the structured lights with different codes;

S403, sequentially projecting the structured lights with different codes to the object 400 to obtain a plurality of coded images 60;

S404, capturing the structured lights reflected by the object 400 to obtain a plurality of captured images 70;

S405, integrating the plurality of coded images 60 into a coded image group according to a projection order, and integrating the plurality of camera images 70 into a captured image group according to a capture order;

S406, extracting the coding block 61 in each of the plurality of coded images 60 according to the position and size of the detecting block 90;

S407, integrating a plurality of coding blocks 61 into a coding block group in a same order as the coded image group;

S408, extracting the capturing block 71 in each of the plurality of captured images 70 according to the position and size of the detecting block 90;

S409, integrating a plurality of capturing blocks 71 into a capturing block group in a same order as the captured image group;

S410, matching the coding block group and the capturing block group;

S411, calculating the disparity between the coding block group and the capturing block group matched with the coding block group;

S412, calculating the depth of the object 400.

Specifically, if images of the coding block group and the capturing block group are in a same order, the coding block group and the capturing block group are successfully matched.

Figure 5A:
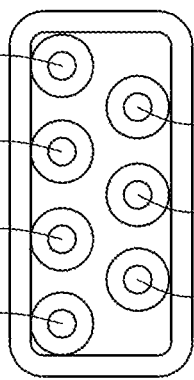
FIG. 5A is a schematic diagram of the multi-point light source of the sensing method in accordance with a first embodiment of the present disclosure.
Figure 5B:
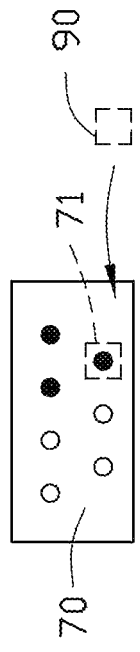
FIG. 5B is a schematic diagram of a coded image group of the sensing method in accordance with the first embodiment of the present disclosure.
Figure 5B:
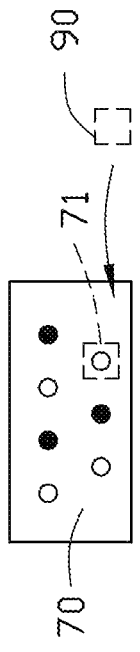
Figure 5B:
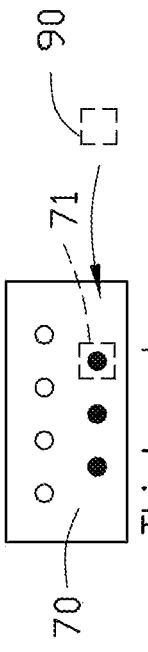
Figure 5C:
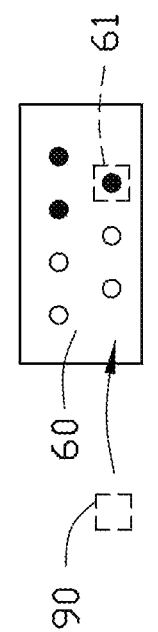
FIG. 5C is a schematic diagram of a captured image group of the sensing method in accordance with the first embodiment of the present disclosure.
Figure 5C:
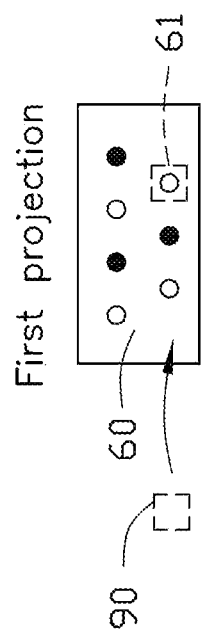
Figure 5C:
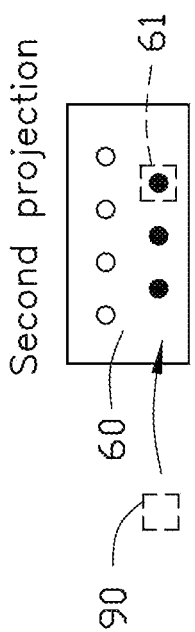
Figure 6:
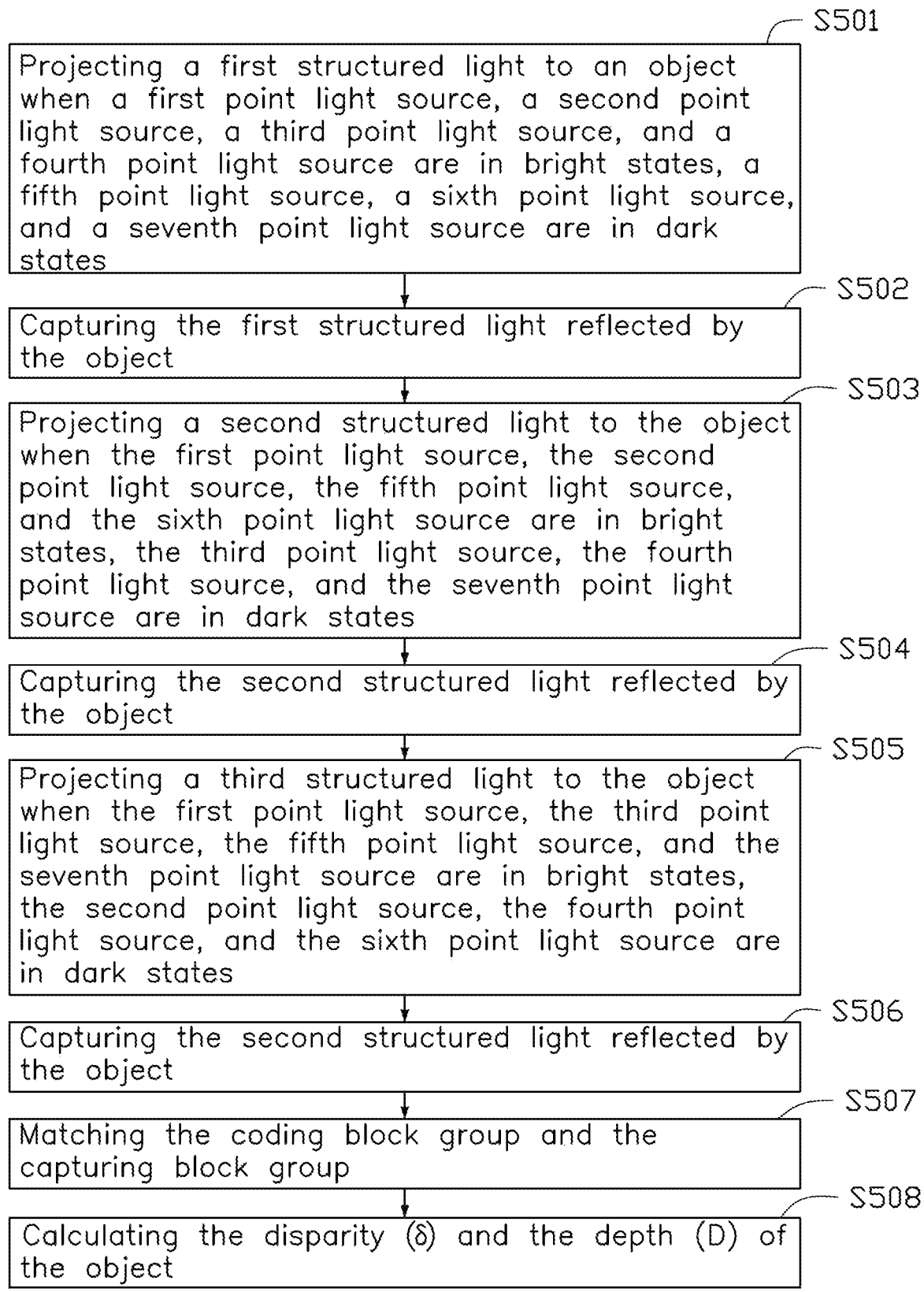
FIG. 6 is a flow chart of a sensing method in accordance with the first embodiment of the present disclosure.

FIG. 5A, FIG. 5B, FIG. 5C, and FIG. 6 show a first embodiment of the sensing method. In the first embodiment, a side length of the detecting block 90 is set to be equal to a distance between each two adjacent point light sources 111. That is, when the size of the detecting block 90 contains one point light source 111, both the coding block 61 extracted in the coded image 60 according to the size of the detecting block 90 and the capturing block 71 extracted in the captured image 70 according to the size of the detecting block 90 are images containing only one point light source 111. Each of the point light sources 111 is either in a bright state or in a dark state. In FIG. 5A and FIG. 5B, the point light source 111 in the bright state is indicated by a hollow dot, and the point light source 111 in the dark state is indicated by a solid dot.

In the first embodiment, there are seven point light sources 111. The seven point light sources 111 are labeled as a first point light source 111a, a second point light source 111b, a third point light source 111c, a fourth point light source 111d, a fifth point light source 111e, a sixth point light source 111f, and a seventh point light source 111g. A method that the processor 30 obtains the depth of the object 400 by generating three structured lights with different codes is described as follows.

S501, the processor 30 controls the projector 10 to project a first structured light to the object 400. When the first structured light is generated, the first point light source 111a, the second point light source 111b, the third point light source 111c, and the fourth point light source 111d are in the bright state, the fifth point light source 111e, the sixth point light source 111f, and the seventh point light source 111g are in the dark state.

S502, the processor 30 controls the camera 20 to capture the first structured light reflected by the object 400.

S503, the processor 30 controls the projector 10 to project a second structured light to the object 400. When the second structured light is generated, the first point light source 111a, the second point light source 111b, the fifth point light source 111e, and the sixth point light source 111f are in the bright state, the third point light source 111c, the fourth point light source 111d, and the seventh point light source 111g are in the dark state.

S504, the processor 30 controls the camera 20 to capture the second structured light reflected by the object 400.

S505, the processor 30 controls the projector 10 to project a third structured light to the object 400. When the third structured light is generated, the first point light source 111a, the third point light source 111c, the fifth point light source 111e, and the seventh point light source 111g are in the bright state, the second point light source 111b, the fourth point light source 111d, and the sixth point light source 111f are in the dark state.

S506, the processor 30 controls the camera 20 to capture the third structured light reflected by the object 400.

S507, the processor 30 matches the coding block group and the capturing block group.

S508, the processor 30 calculates the disparity ($\delta$) and the depth (D) of the object 400.

The number of the point light sources 111 is not limited to being seven. When the number of the point light sources 111 is defined as m (m≥2), a minimum number of the projections is defined as n and satisfies the following relationship $2^{n-1} \leq m \leq 2^n$. A manner of the structured lights generated by the multi-point light source 11 for n times includes: one (or $2^0$) point light source 111 in the bright state appears at intervals of one (or $2^0$) point light source 111 in the dark state, two (or $2^1$) point light sources 111 in the bright states appear at intervals of two (or $2^1$) point light sources 111 in the dark states . . . $2^{n-1}$ point light sources 111 in the bright states appear at intervals of $2^{n-1}$ point light sources 111 in the dark states.

Figure 7A:
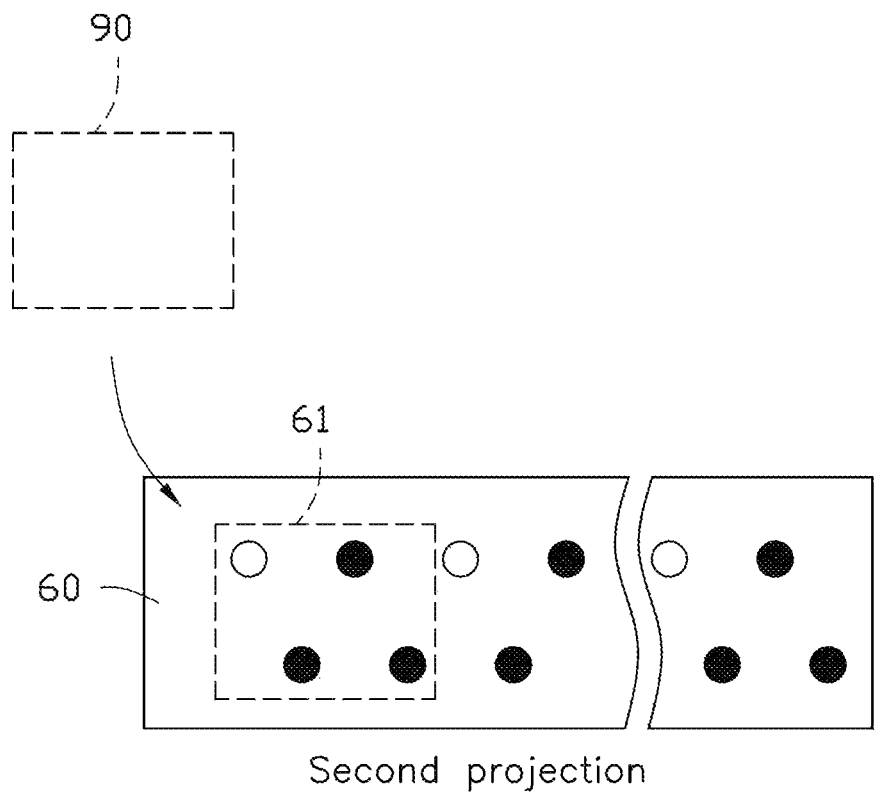
FIG. 7A is a schematic diagram of the coded image group of the sensing method in accordance with a second embodiment of the present disclosure.
Figure 7B:
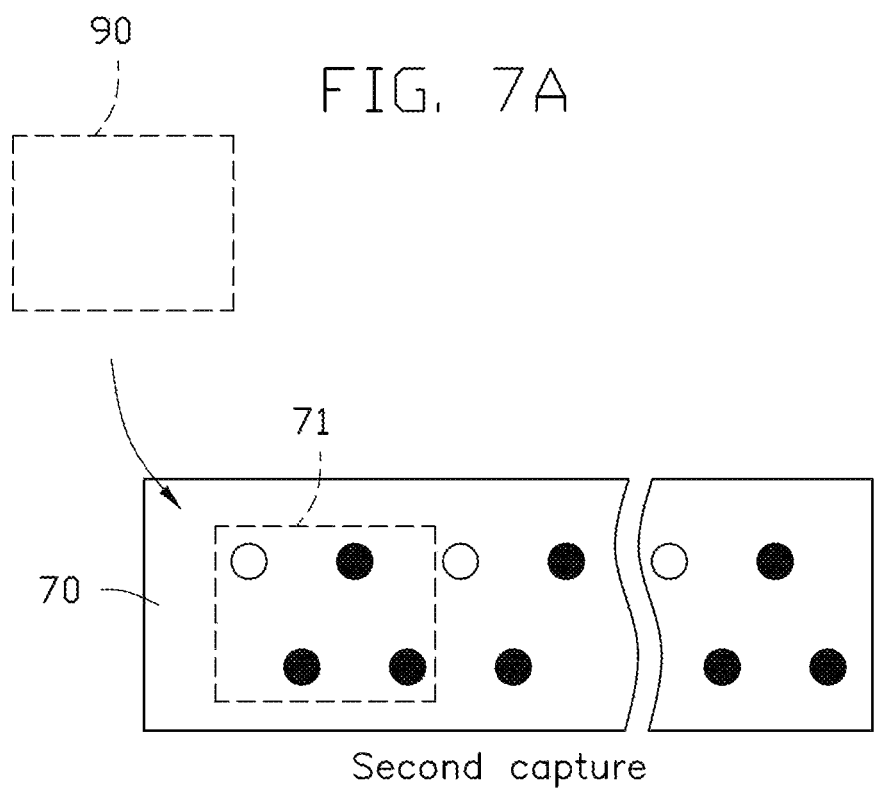
FIG. 7B is a schematic diagram of the captured image group of the sensing method in accordance with the second embodiment of the present disclosure.
Figure 8:
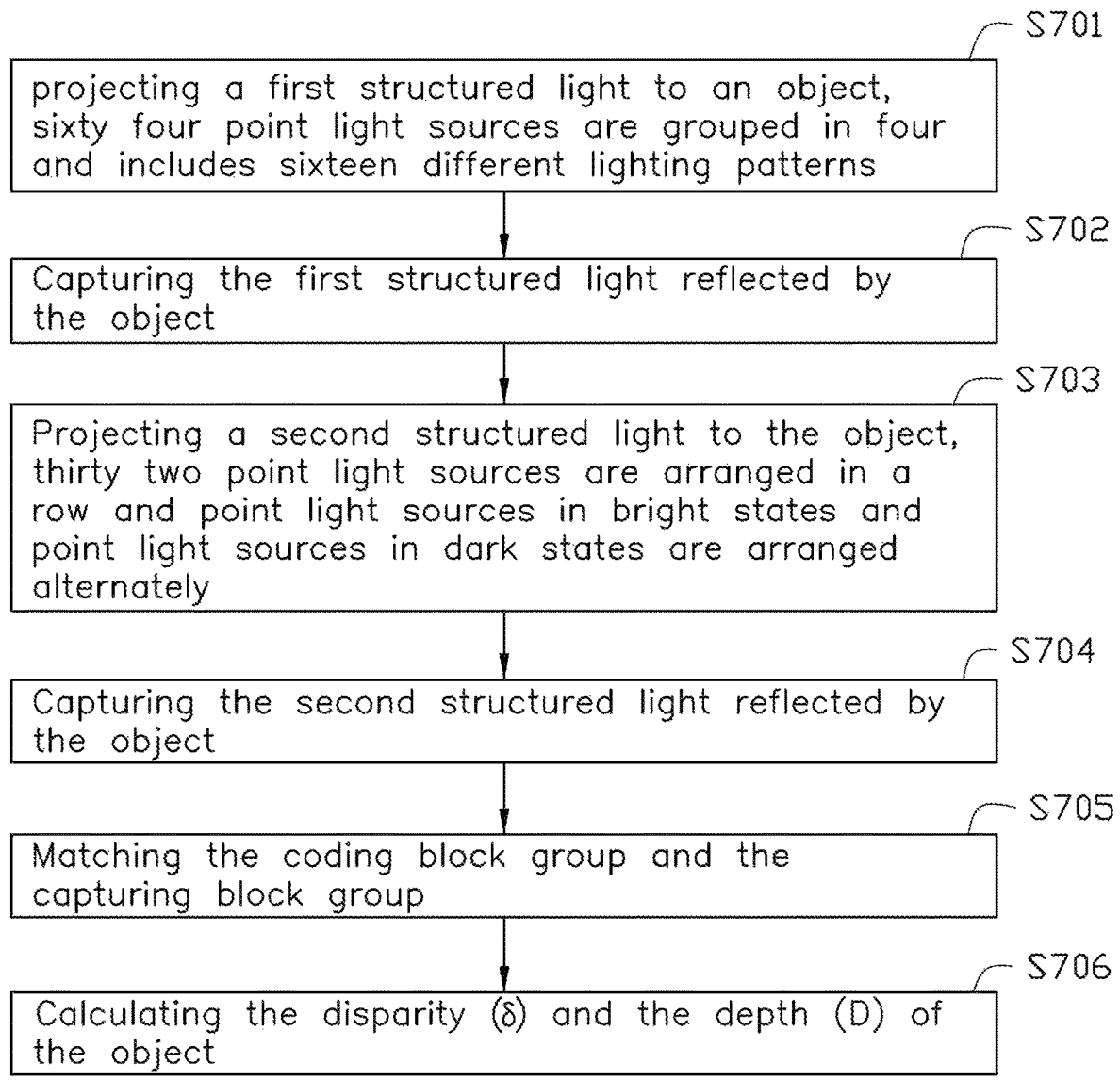
FIG. 8 is a flow chart of the sensing method in accordance with the second embodiment of the present disclosure.

FIG. 7A, FIG. 7B, and FIG. 8 show a second embodiment of the sensing method. In the second embodiment, there are sixty-four point light sources 111, and the sixty-four point light sources 111 are evenly divided into two lines. Both the coding block 61 extracted in the coded image 60 according to the size of the detecting block 90 and the capturing block 71 extracted in the captured image 70 according to the size of the detecting block 90 are images containing four point light sources 111. Since each point light source 111 is either in the bright state or in the dark state, and each coding block 61 (or each capturing block 71) contains four point light sources 111, each image has sixteen (or $2^4$) different lighting patterns. A method that the processor 30 obtains the depth of the object 400 by generating two structured lights with different codes is described as follows.

S701, the processor 30 controls the projector 10 to project a first structured light to the object 400. The sixty four point light sources 111 are grouped in fours and include sixteen different lighting patterns.

S702, the processor 30 controls the camera 20 to capture the first structured light reflected by the object 400.

S703, the processor 30 controls the projector 10 to project a second structured light to the object 400. Among thirty two point light sources 111, which are arranged in a row, one point light source 111 in the bright state appears at intervals of one point light source 111 in the dark state, that is, point light sources in the bright states and point light sources in the dark states are arranged alternately.

S704, the processor 30 controls the camera 20 to capture the second structured light reflected by the object 400.

S705, the processor 30 matches the coding block group and the capturing block group.

S706, the processor 30 calculates the disparity ($\delta$) and the depth (D) of the object 400.

The number of the point light sources 111 is not limited to being sixty four. In other embodiments, the number of the point light sources 111 used in the sensing method can be less than sixty four, as long as lighting patterns are different from each other when generating the first structured light.

The process at block S703 can avoid the case where the lighting state of the first four point light sources 111 and the lighting pattern of the last four point light sources 111 among six consecutive point light sources 111 are same as S701. It should be noted that the lighting pattern of the point light sources 111 is not limited to what is described in S703, where that one point light source 111 in the bright state appears at intervals of one point light source 111 in the dark state, as long as the lighting pattern of the first four point light sources 111 and the lighting pattern of the last four point light sources 111 among six consecutive point light sources 111 are different.

Compared with the prior art, the present disclosure employs the processor 30 to control the multi-point light source 11 to sequentially project the structured lights with different codes to an object 400 to obtain the coded images 60, control the camera 20 to sequentially capture the structured lights reflected by the object 400, and calculate the depth of the object 400 according to the parameter information and the distance information stored in the storage device 40. The present disclosure can reduce the size of the detecting block 90 by equidistant arrangement of the point light sources, thereby improving sensing accuracy.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A structured light depth sensor for sensing a depth of an object, comprising:
a projector for projecting structured lights with different codes to the object;
a camera located on one side of the projector and configured for capturing the structured lights reflected by the object;
a storage device for storing parameter information of the camera and distance information between the projector and the camera; and
a processor electrically connected to the projector, the camera, and the storage device, wherein, the processor controls the projector to sequentially project the structured lights with different codes to the object, controls the camera to sequentially capture the structured lights reflected by the object, and calculates the depth of the object according to the parameter information of the camera, the distance information between the projector and the camera, information of the structured lights projected by the projector, and information of the structured lights captured by the camera;
wherein a coded image is obtained when the processor controls the projector to project one of the structured lights with a certain code, and a captured image is obtained when the camera captures the structured light with the certain code reflected by the object; and
wherein the captured image is compared with a coding block set in the coded image by the processor to match a capturing block, a disparity ($\delta$) of the coding block and the capturing block is calculated by the processor and is equal to a difference between $x_l$ and $x_r$, where $x_l$ represents a distance between the coding block and an extension line of the projector, and $x_r$ represent a distance between the capturing block and an extension line of the camera.

2. The structured light depth sensor as claimed in claim 1, wherein the depth (D) of the object is calculated by the processor according to the following formula: $D=B*F/\delta$, where B represents a distance between the camera and the projector that stored in the storage device as the distance information, and F represents a focal length of the camera that stored in the storage device as the parameter information.

3. The structured light depth sensor as claimed in claim 1, wherein the projector comprises a multi-point light source comprising a plurality of point light sources, the point light sources are arranged in rows and equally spaced apart from each other, and each of the plurality of point light sources is either in a bright state or in a dark state.

4. The structured light depth sensor as claimed in claim 3, wherein the multi-point light source is a vertical-cavity surface-emitting laser.

5. The structured light depth sensor as claimed in claim 3, wherein the projector further comprises a diffractive optical element positioned opposite to the multi-point light source, and configured for dividing a light emitted from the multi-point light source into a plurality of beams.

6. The structured light depth sensor as claimed in claim 5, wherein the projector further comprises a lens positioned between the multi-point light source and the diffractive optical element, and configured for transmitting the light emitted from the multi-point light source.

7. A sensing method, adapted for a structured light depth sensor, the structured light depth sensor comprising a projector, a camera, a processor, and a storage device, the sensing method comprising:
generating structured lights with different codes;
sequentially projecting the structured lights to an object to obtain a plurality of coded images;
capturing the structured lights reflected by the object to obtain a plurality of captured images;
integrating the plurality of coded images into a coded image group according to a projection order, and integrating the plurality of camera images into a captured image group according to a capture order;
setting a detecting block;
extracting a coding block in each of the plurality of coded images according to the position and size of the detecting block;

integrating a plurality of coding blocks into a coding block group in a same order as the coded image group;

extracting a capturing block in each of the plurality of captured images according to the position and size of the detecting block;

integrating a plurality of capturing blocks into a capturing block group in a same order as the captured image group;

matching the coding block group and the capturing block group;

calculating a disparity between the coding block group and the capturing block group matched with the coding block group; and calculating a depth of the object.

8. The sensing method as claimed in claim 7, wherein if images of the coding block group and the capturing block group are in a same order, the coding block group and the capturing block group are successfully matched.

9. The sensing method as claimed in claim 8, wherein the processor controls the projector to sequentially project the structured lights with different codes to the object and controls the camera to sequentially capture the structured lights reflected by the object, the storage device stores parameter information of the camera and distance information between the projector and the camera, and the processor calculates the depth of the object according to the parameter information of the camera, the distance information between the projector and the camera, information of the structured lights projected by the projector, and information of the structured lights captured by the camera.

10. The sensing method as claimed in claim 9, wherein the projector comprises a multi-point light source comprising a plurality of point light sources, the point light sources are arranged in rows and equally spaced apart from each other, and each of the plurality of point light sources is either in a bright state or in a dark state.

11. The sensing method as claimed in claim 10, wherein the projector further comprises a diffractive optical element positioned opposite to the multi-point light source, and configured for dividing a light emitted from the multi-point light source into a plurality of beams.

12. The sensing method as claimed in claim 11, wherein the projector further comprises a lens positioned between the multi-point light source and the diffractive optical element, and configured for transmitting the light emitted from the multi-point light source.

13. The sensing method as claimed in claim 9, wherein the depth (D) of the object is calculated by the processor according to the following formula: $D=B*F/\delta$, where B represents a distance between the camera and the projector that stored in the storage device as the distance information, F represents a focal length of the camera that stored in the storage device as the parameter information, and $\delta$ represents a disparity of the coding block and the capturing block.

14. The sensing method as claimed in claim 13, wherein the disparity of the coding block and the capturing block is calculated by the processor and is equal to a difference between $x_l$ and $x_r$, where $x_l$ represents a distance between the coding block and an extension line of the projector, and $x_r$ represents a distance between the capturing block and an extension line of the camera.

15. The sensing method as claimed in claim 10, wherein when the size of the detecting block contains one point light source, a number of the point light sources (m) and a minimum number (n) of the projections satisfy the following relationship: $2^{n-1} \leq m \leq 2^n$, $m \geq 2$.

16. The sensing method as claimed in claim 15, wherein a manner of the structured lights generated by the multi-point light source for n times comprises: one (or $2^0$) point light source in the bright state appears at intervals of one (or $2^0$) point light source in the dark state, two (or $2^1$) point light sources in the bright states appear at intervals of two (or $2^1$) point light sources in the dark states . . . $2^{n-1}$ point light sources in the bright states appear at intervals of $2^{n-1}$ point light sources in the dark states.

17. The sensing method as claimed in claim 12, wherein the point light sources are evenly divided into two rows, when the size of the detecting block contains four point light sources arranged in a matrix, both the coding block and the capturing block are images containing four point light sources, and each image has sixteen different lighting patterns.

18. The sensing method as claimed in claim 17, wherein a number of the point light sources is sixty four, the processor controls the projector projecting two structured lights with different codes to the object, a first structured light contains the sixteen different lighting patterns, a second structured light satisfies a condition that the lighting pattern of the first four point light sources and the lighting pattern of the last four point light sources among six consecutive point light sources are different.

* * * * *